Feb. 8, 1966 M. I. CURL ETAL 3,233,828
WHEEL LIFE INDICATOR
Filed Nov. 10, 1964 2 Sheets-Sheet 1

INVENTORS
MARK I. CURL
STANFORD C. LOCKHART
JESSE G. HAWLEY
HAROLD N. YAZELL

*J.B. Holden*
ATTORNEY

Feb. 8, 1966  M. I. CURL ETAL  3,233,828
WHEEL LIFE INDICATOR
Filed Nov. 10, 1964  2 Sheets-Sheet 2

INVENTORS
MARK I. CURL
STANFORD C. LOCKHART
JESSE G. HAWLEY
HAROLD N. YAZELL

*J.B. Holden*
ATTORNEY

– -

United States Patent Office 3,233,828
Patented Feb. 8, 1966

3,233,828
WHEEL LIFE INDICATOR
Mark I. Curl, Cuyahoga Falls, Ohio, Jesse G. Hawley, Penn Yan, N.Y., and Stanford C. Lockhart, Akron, and Harold N. Yazell, Cuyahoga Falls, Ohio, assignors to The Goodyear Tire & Rubber Company, Akron, Ohio, a corporation of Ohio
Filed Nov. 10, 1964, Ser. No. 410,207
5 Claims. (Cl. 235—95)

This invention relates to a wheel life indicator or a magneto-mechanical wheel revolution counter, and more particularly to a reduction gearing and counter mechanism having a permanent magnet-type clutch drive which is readily adaptable for attachment to a hub cap which is removably positioned upon a rotatable wheel.

Heretofore it has been known that various types of wheel revolution indicators have been devised. However, these indicators are not adapted to provide wheel life or tire life measurements, but rather are adapted to measure speed and distance. However, the wheel life becomes an important factor where aircraft wheels are involved, as wheel or tire failure upon landing or take-off of an aircraft can have very serious and dangerous results. The problem of wheel life in aircraft has been recognized for a long time, but the present method utilized to keep track of wheel life is to strike out a number on an attached metal plate during each overhaul, and this is only to approximate usage. In other words, it has two serious defects. Namely, it reckons the hours instead of the revolutions, and further there is no way for the same or different persons to be sure whether the number has or has not been struck unless additional records are kept. This method also requires personnel to differentiate between regular overhaul inspections and simple tire and wheel repairs. An accurate indication of individual wheel revolutions, particularly in aircraft wheels, is needed.

Therefore, it is the general object of the present invention to avoid and overcome the foregoing and other difficulties of prior art practices and meet the need of the art by providing a magneto-mechanical wheel revolution counter which will provide wheel revolution information on each individual wheel to provide an accurate indication of wheel life and for tire life.

A further object of the invention is to provide a wheel revolution counter which can be readily secured to a removable hub cap for an aircraft wheel, and wherein the only moving parts are in the counter itself as a magnetic clutch drive is utilized.

Another object of the invention is to provide a wheel revolution counter for aircraft wheels which is compact, accurate, inexpensive, and readily adaptable to any aircraft wheel.

A further object of the invention is to provide a wheel revolution counter which may be used in association with anti-skid apparatus positioned in the axle mounting an aircraft wheel without disturbing the anti-skid apparatus in any way.

A further object of the invention is to provide a wheel revolution counter which may be readily attached to an aircraft wheel, and wherein the total revolutions of the wheel will be maintained to an accuracy of within about five percent, and wherein the wheel may be changed from one side to another of the aircraft, or even changed to another aircraft, without changing or destroying the total count of revolutions for the particular wheel associated with the counter.

The aforesaid objects of the invention and other objects which will become apparent as the description proceeds are achieved by providing in a wheel revolution counter the combination of a fixed axle, a wheel rotatably mounted on the axle, revolution indication means having an input shaft removably mounted to the wheel, and magnetic means operatively mounted in substantially fixed relation to the axle and maintaining the input shaft of the revolution indicator in substantially fixed relation in its magnetic field upon the rotation of the wheel.

For a better understanding of the invention, reference should be had to the accompanying drawings, wherein.

While it should be understood that the revolution counter of the invention may be adapted to any type of rotating unit, that it is particularly adaptable to measure the life of aircraft wheels and tires accurately and upon interchange of wheels, and hence it has been so illustrated and will be so described. Also, for the purpose of convenience, similar numerals are utilized to describe corresponding parts in the various views of the drawings.

Figure 1:
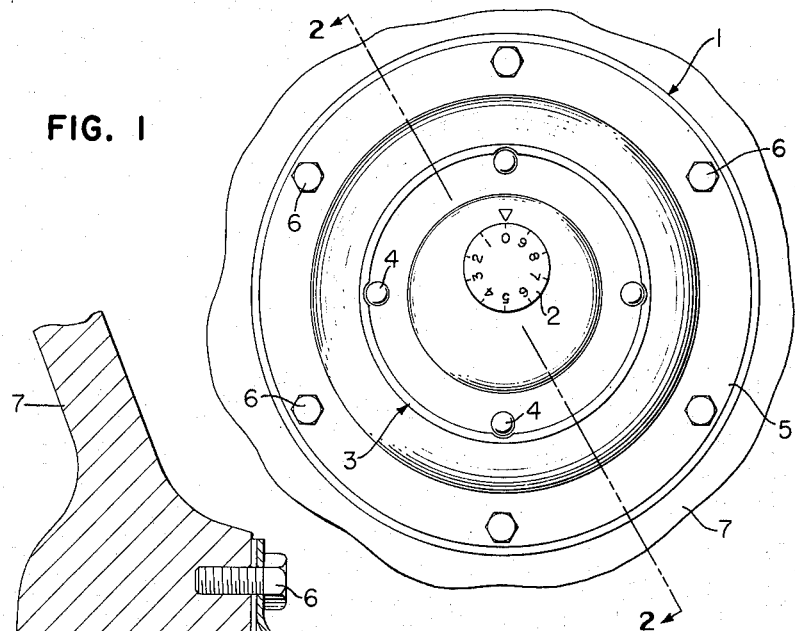
FIGURE 1 is a plan view of the indication dial and hub cap mounting of a wheel revolution counter comprising one embodiment

For a description of the invention, reference should be had to FIGURE 1 of the drawings wherein the numeral 1 indicates generally a wheel revolution counter which comprises a counter disc 2 mounted into a revolution indicator unit, indicated generally by the numeral 3, which unit 3 is secured by rivets 4 to a hub cap 5. The hub cap 5 is removably mounted by bolts 6 to a rotatable wheel 7.

Figure 2:
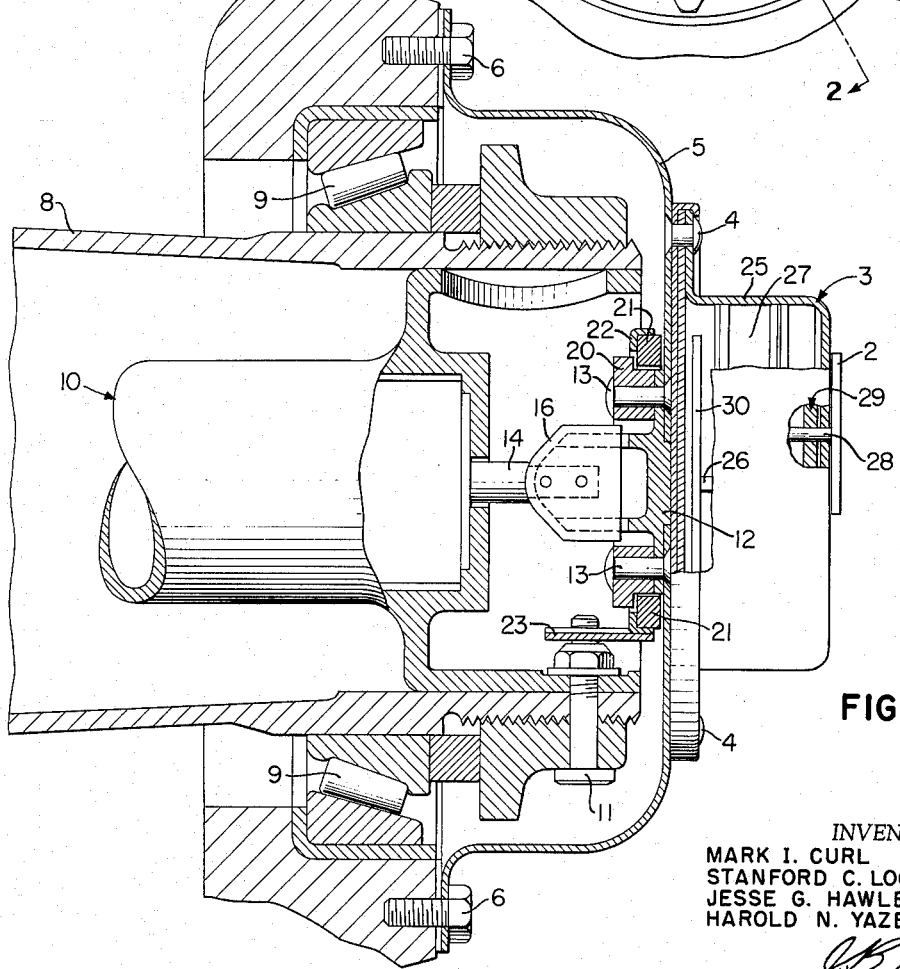
FIGURE 2 is an enlarged vertical cross sectional view of the counter of FIGURE 1, partially sectioned, and partially broken away, taken substantially on the line 2—2 of FIGURE 1.

With reference to FIGURE 2, the wheel 7 is mounted in a conventional manner to be rotatable upon a fixed axle 8 by means of bearings 9. The axle 8 is normally hollow, and is adaptable to mount a substantially conventional anti-skid unit, indicated generally by the numeral 10. The anti-skid unit 10 is normally held in fixed relation with the axle 8 by suitable means, such as a bolt 11. The hub cap 5 removably mounted by the bolts 6 to the rotatable wheel 7 has an anti-skid driver tube 12 operatively secured thereto, by suitable means, such as rivets 13. The driver tube 12 contains a bore which is adapted to receive a drive shaft 14 for the anti-skid unit 10. The shaft 14 has a driving key 15 mounted thereon by pins 15a which key is positioned in a slot in the driver tube 12 for an interlocked driving relationship therewith. Also, a bell-shaped housing 16 operatively engaging the drive shaft 14 is adapted to slidably engage the outer surface of the driver tube 12 so as to assist in alignment and the operative driving connection therebetween. In addition to the pins 15, a suitable keyed relation between the driver tube 12 and the housing 16 and/or the drive shaft 14 may be utilized for a positive drive. Thus, it should be understood that the drive shaft 14 for the anti-skid unit 10 is rotated upon rotation of the wheel 7 because of any suitable operative connection between the drive shaft 14 and the rotating hub cap 5 through the connecting tube 12.

The essential structural features of the invention are also disclosed in FIGURE 2, wherein it is seen that a circular shaped guide or retaining ring 20 is also operatively secured by the rivets 13 mounting the driver tube 12 to the hub cap 5. The retaining ring 20 provides a slidable mounting and guide for a circular shaped magnetic ring 21. The magnetic ring 21 is rotatable around the retaining ring 20 and also is axially slidable thereon. In order to provide a means to control the rotation of the magnetic ring 21, it is mounted in a circular shape angle frame 22 made from a non-magnetic material, such as aluminum, which frame 22 has a projecting arm 23 extending therefrom which is adapted to engage the extended end of the bolt 11. Suitable adhesive means may be utilized to mount the magnetic ring 21 in the frame 22. Thus, the magnetic ring 21 is maintained in a fixed relationship with the axle 8 upon rotation of the wheel 7 and hub cap 5, as the projecting lever 23 will engage the extended end of the bolt 11 and hold the magnetic ring 21 in a fixed relationship with respect to the axle 8. Thus, there will be relative movement between the retaining ring 20 and the magnetic ring 21 as well as between the magnetic ring 21 and the hub cap 5. It might be necessary, because of these relative movements, to provide a lubricant between these surfaces, such as graphite, or other suitable lubricants.

Therefore, it should be understood that the only adjustments to the usual aircraft wheel assembly required by the invention, as described thus far, are the addition of the retaining ring 20 and the magnetic ring 21 into the hub cap 5. This merely requires extending the length of the rivets 13 for the mounting purposes.

To complete the structure of the invention, the wheel life indicator 3 which is a completely closed and sealed unit within a frame 25, is then operatively mounted to the hub cap 5 by means of rivets 4, as disclosed above. The indicator 3 contains an input shaft 26 driving into a gear reduction unit 27, which gear reduction unit has an output shaft (not shown) which drives a pawl and ratchet assembly, indicated generally by numeral 29, which in turn drives a shaft 28 carrying the indicator disc 2. In order to provide rotative movement to the input shaft 26, a substantially straight magnetic drive bar 30, of a length approximately the outside diameter of the magnetic ring 21, is operatively mounted thereto. The magnetic ring 21 has a north pole and a south pole that is 180° around the ring from the north pole. The field of the ring magnet 21 causes the magnetic drive bar 26 in the indicator 3 to stand still while the balance of the wheel 7, hub cap 5 and wheel life indicator 3 rotate, thereby causing an accurate indication of wheel revolutions upon the input shaft 26. Test results have proved that this set up will cause the counter disc 2 to record true wheel revolutions within an accuracy for unidirectioned rotation of about one percent. Where wheels are switched in rotation the accuracy of readout is about five percent. While it should be understood that it is desirable for the drive bar 30 to also be magnetic and have a north and south pole for alignment with the magnetic ring 21, this is not absolutely necessary as the magnetic field of the magnetic ring 21 will pass through the housing 25 of the indicator unit 3 and maintain the drive bar 30 in a fixed position regardless of whether it is also a permanent magnet.

Figure 3:
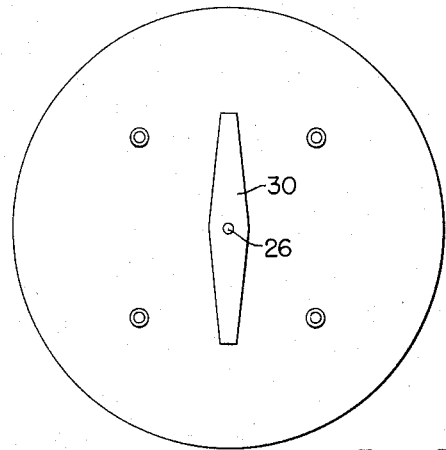
FIGURE 3 is a plan view of the drive bar associated with the counter of FIGURE 1.
Figure 4:
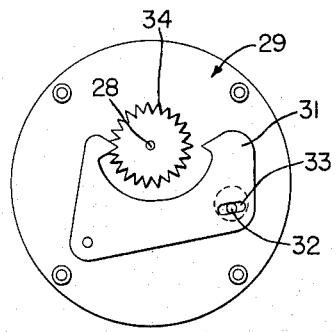
FIGURE 4 is a plan view of the ratchet and pawl, driven by the output shaft of the counter of FIGURE 1.

In order to better understand the individual components of the indicator unit 3, reference should be had first to FIGURE 3 where a plan view of the drive bar 30 operatively mounted to the input shaft 26 is disclosed. FIGURE 4 illustrates generally the pawl and ratchet assembly 29 which includes a two ended pawl 31 operatively driven by a cam 32 connected to the output shaft 28 from the gear reduction unit 27. It is a feature of the invention that the cam 32 which is driving the pawl 31 is eccentrically set in relation to a receiving hole 33 so that the pawl 31 will drive a ratchet gear 34 in one direction only regardless of the direction of rotation of the input shaft 28 driving the cam 32. In other words, it is by this simple arrangement that the wheel life indicator 3 is adaptable for utilization on wheels on either side of an aircraft as the direction of rotation of the wheel itself is not important since the wheel life indicator 3, through the pawl and ratchet assembly 29 will indicate the number of revolutions regardless of the direction of wheel rotation.

Figure 5:
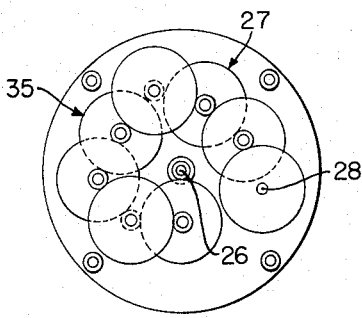
FIGURE 5 is a plan view of one form of gear arrangement in the reduction gear unit of the counter of FIGURE 1.

FIGURE 5 illustrates one structural concept for the reduction gear unit 27. In this example, the input shaft 26 drives through an 8-gear train, indicated generally by the numeral 35, to provide the desired ratio reduction for the output shaft 28. Generally, the invention contemplates that the reduction gear unit 27 will provide a 400,000 to 1 ratio which in other words means that the drive shaft 26 must rotate 400,000 times to provide one revolution of the output shaft 28.

Figure 6:
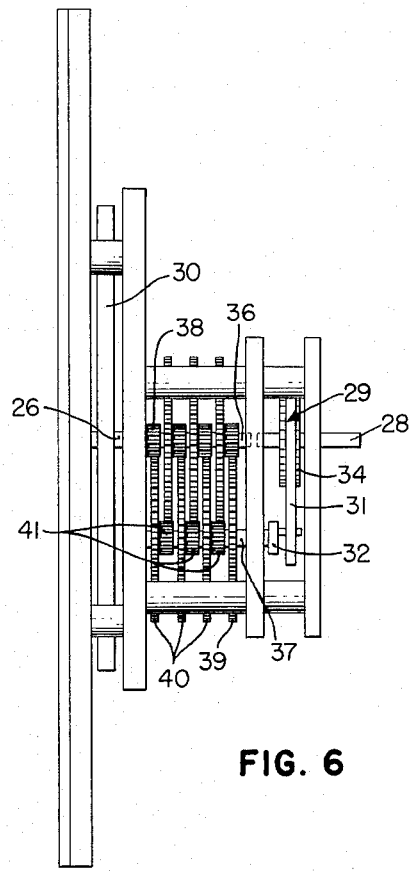
FIGURE 6 is an elevation of another embodiment of a reduction gear unit applicable to the counter of FIGURE 1.

FIGURE 6 illustrates another structural arrangement for a reduction gear unit 27, which may be more compact, less expensive, and therefore more desirable. In essence, this unit comprises only two shafts, namely a shaft 36 operatively and directly connected to the input shaft 26 driven by the drive bar 30, and an output shaft 37 which is adapted to operatively drive the pawl and ratchet assembly 29, as explained with reference to FIGURE 4 above. In this reduction gearing, only a first drive pinion gear 38 is operatively connected to the shaft 36 driven by the input shaft 26. Likewise, only a last spur gear 39 is operatively connected to the output shaft 37. All remaining spur gears 40 and drive pinion gears 41 on the respective shafts 26 and 37, are slidably or rotatably mounted thereon. This simple arrangement will provide the desired output ratio between input and output shafts where only two shafts are utilized and a unique stacking arrangement of the spur and drive gears is possible. Again, it is desirable that the ratio between the input revolutions and the output revolutions will be 400,000 to 1.

Although it has been mentioned heretofore that the desired gear ratio for the reduction gear unit 27 should be 400,000 to 1, it should be understood that any suitable ratio for the desired wheel life can be utilized. However, utilizing the 400,000 to 1 reduction ratio, and providing 25 teeth to the ratchet 34 in the pawl and ratchet assembly 29, means that the counter disc 2 will make one complete revolution for 25×400,000 or 10,000,000 revolutions of the input shaft. Since the counter disc 2 has 100 equally spaced divisions, it is possible to provide readout to within 100,000 revolutions. Obviously, in place of the counter disc 2, a digital counter could be utilized if desired.

The invention contemplates that if anti-skid equipment is not in the way, any suitbale type of direct drive for the wheel life indication may be utilized. The indicator mountng may have to be inside the hub cap, rather than outside, under some conditions.

Thus, it is seen that the objects of the invention have been achieved by providing a wheel revolution counter which utilizes a separate revolution indicator unit which may be fixedly attached to the hub cap of an aircraft wheel and where only one small mounting adjustment of a magnetic ring within the hub cap is necessary. The indicator unit is compact and integral of itself, and a highly effective and simplified magnetic drive is utilized to provide wheel revolution input thereinto. The apparatus is adaptable to measure wheel revolutions regardless of the direction of revolution of the wheel, and the counter does not in any way interfere with any of the present equipment currently carried inside the hub cap or axle of aircraft wheels. The unit is compact, durable, inexpensive, and very accurate. Its life, without maintenance is more than the normal life for aircraft wheels and tires. A simplified reduction gear driving unit has been incorporated to further increase the compactness and reduce the cost of the unit.

Although in accordance with the patent statutes, only one best known embodiment of the invention has been illustrated and described in detail, it is to be particularly understood that the invention is not limited thereto or thereby, but that the inventive scope is defined in the appended claims.

What is claimed is:
1. In a wheel revolution counter, the combination of
- a non-rotatable axle,
- a wheel rotatably mounted to the axle,
- a hub cap removably affixed to the wheel,
- an integral counter unit operatively mounted to the hub cap, said counter unit comprising
    - a gear reducer having an input shaft and an output shaft operatively mounted therein,
    - a revolution indicator means operatively mounted to the counter unit and driven by the output shaft of said gear reducer, and
    - an elongated magnetic drive bar means operatively connected at about the center thereof to the input shaft of said gear reducer, and
- annular magnetic ring means having a diameter about the same as the length of the drive bar means operatively carried by said axle in substantially fixed relation and positioned in adjacent parallel relation to said magnetic drive bar means so as to hold said magnetic drive bar means in substantially fixed relation in its magnetic field upon the rotation of said wheel.

2. In a wheel revolution counter, the combination of
- a non-rotatable axle,
- a wheel rotatably mounted to the axle,
- a hub cap removably affixed to the wheel,
- an integral counter unit having an input shaft and an output shaft operatively mounted to the hub cap,
- a revolution indicator means operatively mounted to the counter unit and driven by the output shaft thereof,
- magnetic drive bar means operatively connected to the input shaft of said counter unit, and
- magnetic ring means operatively mounted to said axle in substantially fixed relation and positioned adjacent to said magnetic drive bar means so that the magnetic fields are attracted to each other to hold said magnetic drive bar means in substantially fixed relation to the magnetic ring means upon the rotation of said wheel.

3. In a wheel revolution counter, the combination of
- a fixed axle,
- a wheel rotatably mounted to the axle,
- a hub cap removably mounted to the wheel,
- an enclosed housing operatively mounted to the hub cap,
- a gear reducer operatively mounted within the counter unit, said gear reducer comprising an input shaft driving a sequential gear train with the last gear on the train driving an output shaft,
- a counter dial connecting the dial to the output shaft of the gear reduces and actuated by the rotation of the output shaft of the gear reducer so that the counter is driven in the same direction regardless of the direction of rotation of the output shaft of the gear reducer,
- an elongated drive bar operatively mounted about centrally thereof to the input shaft of the gear reducer, and
- an annular magnetic ring means having a diameter about equal to the length of the drive bar operatively mounted in substantially fixed relation to the axle and concentrically aligned with the input shaft of the gear reducer and in adjacent parallel relation to the drive bar to hold said magnetic drive bar in substantially fixed relation therewith upon the rotation of said wheel by interattraction of the magnetic fields.

4. In a wheel revolution counter, the combination of
- a fixed axle,
- a wheel rotatably mounted to the axle,
- a hub cap removably mounted to the wheel,
- an enclosed housing operatively mounted to the hub cap,
- a gear reducer operatively mounted within the housing, said gear reducer comprising an input shaft driving a drive gear, an output shaft having a spur gear fixed thereon, a plurality of alternately stacked drive and spur gears rotatably received on both the input and output shafts and engaging therewith so that the last drive gear on the input shaft engages to drive the spur gear affixed to the output shaft,
- pawl and ratchet means driven unidirectional by the rotation of the output shaft of the gear reducer, and
- magnetic means operatively mounted in substantially fixed relation to the axle and holding said input shaft of said gear reducer in substantially fixed relation in its magnetic field upon the rotation of said wheel.

5. A wheel revolution counter according to claim 4 wherein an elongated magnetic drive bar is operatively affixed about centrally thereof to the input shaft inside the enclosed housing to attract to said magnetic means and hold said input shaft in fixed relation, and where the magnetic means is an annular ring having a diameter about equal to the length of the drive bar.

References Cited by the Examiner

UNITED STATES PATENTS

| | | | |
|---|---|---|---|
| 1,387,056 | 8/1921 | Karich | 235—95.2 |
| 1,807,163 | 5/1931 | Mills | 235—95.2 |
| 1,908,801 | 5/1933 | Veeder | 235—95.2 |
| 2,858,461 | 10/1958 | Hague et al. | 235—94 |

LEO SMILOW, *Primary Examiner.*